(12) United States Patent
Imbert

(10) Patent No.: US 6,782,741 B2
(45) Date of Patent: Aug. 31, 2004

(54) DEVICE FOR FIXING AN ELECTRONIC MONITORING MODULE ONTO A TIRE

(75) Inventor: Lucette Imbert, La Roche-Blanche (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/678,835

(22) Filed: Oct. 3, 2003

(65) Prior Publication Data

US 2004/0112489 A1 Jun. 17, 2004

Related U.S. Application Data

(63) Continuation of application No. PCT/EP02/03840, filed on Oct. 17, 2002.

(30) Foreign Application Priority Data

Apr. 9, 2001 (FR) .............................. 01 05071

(51) Int. Cl.[7] .............................................. B60C 23/02
(52) U.S. Cl. .................... 73/146.5; 340/442; 152/152.1
(58) Field of Search ........................... 152/152.1, 367, 152/368, 369, 370, 371, 372; 340/442, 445, 448, 447, 449, 426.33; 301/95.101; 73/146, 146.5, 146.2, 146.3

(56) References Cited

U.S. PATENT DOCUMENTS

| | | | |
|---|---|---|---|
| 6,255,940 B1 | 7/2001 | Phelan | |
| 6,462,650 B1 * | 10/2002 | Balzer et al. | ............... 340/442 |
| 6,688,353 B1 * | 2/2004 | Koch | ..................... 152/152.1 |
| 6,705,365 B1 * | 3/2004 | Wilson | ................... 152/152.1 |

FOREIGN PATENT DOCUMENTS

| | | | |
|---|---|---|---|
| EP | 0 936 089 A2 | 8/1999 | |
| EP | 936089 A2 * | 8/1999 | ........... B60C/23/04 |
| WO | WO 99/41093 | 8/1999 | |

* cited by examiner

Primary Examiner—Frantz F. Jules
(74) Attorney, Agent, or Firm—Martin Farrell; E. Martin Remick; Felipe J. Farley

(57) ABSTRACT

The invention relates to a device for fastening an electronic monitoring module onto a tire comprising a patch (12) of rubber mix, an upper surface of which bears at least one rigid insert (18, 19) having a threaded recess (181, 191) intended to cooperate with a screw (14, 15) and a lug (131, 132) on a casing (13) bearing the electronic monitoring module.

20 Claims, 2 Drawing Sheets

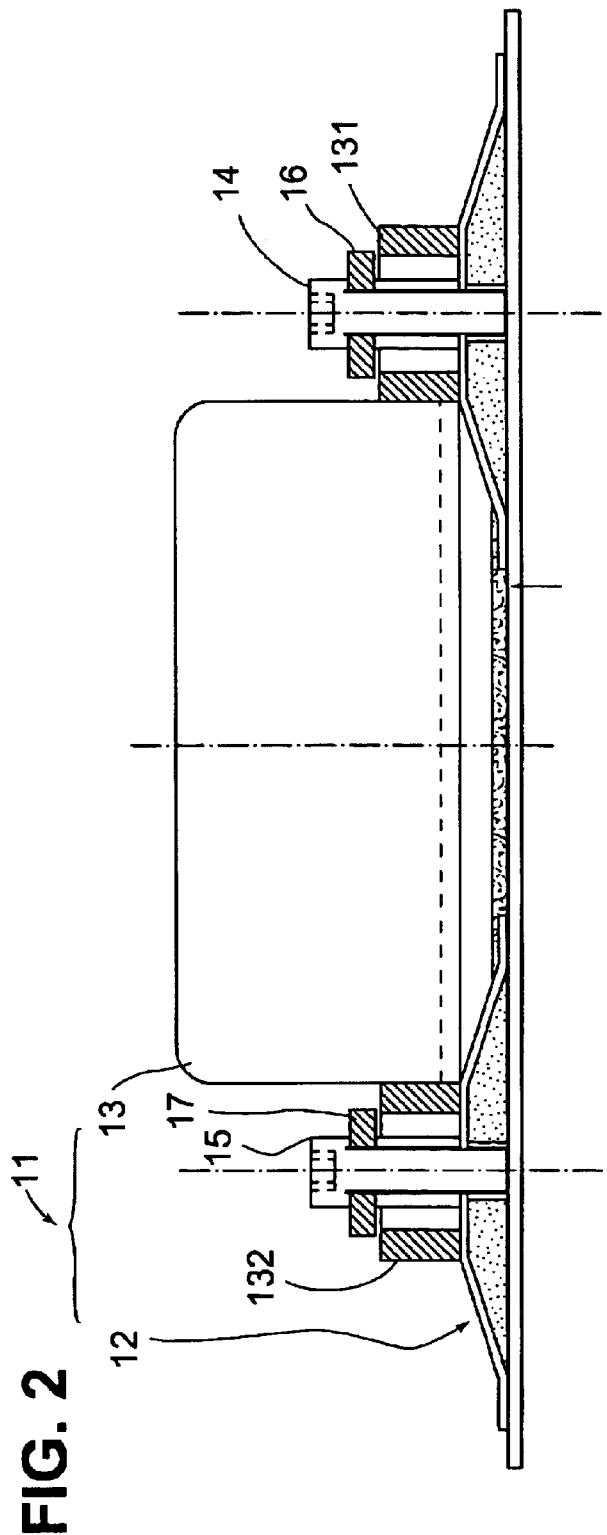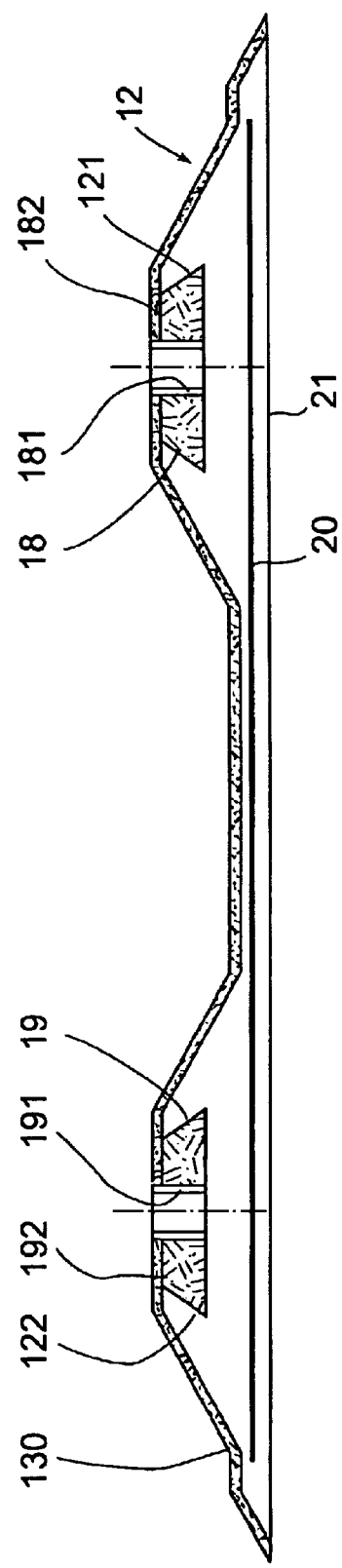

DEVICE FOR FIXING AN ELECTRONIC MONITORING MODULE ONTO A TIRE

This application is a continuation of PCT/EP02/03840 filed Oct. 17, 2002

BACKGROUND AND SUMMARY

The invention relates to tires fitted with removable electronic monitoring modules and a device for fastening such modules onto the tires, which modules are generally encapsulated in rigid casings.

It has nowadays become very important to be able to monitor the operating conditions of tires, such as load, internal pressure and internal temperature, in order in particular to reduce the cost of the tires and to maximize the efficiency of a vehicle. Of course, such monitoring is particularly advantageous on tires for heavy vehicles or earth-mover tires, which are expensive and some of which can be recapped.

The currently existing electronic monitoring modules, which may have their own power supply or may require an external power-supply source, are capable of storing information for future evaluation and/or of transmitting data on demand. It should be noted that typical modules are described in particular in U.S. Pat. Nos. 4,862,486, 5,218,861; and 5,573,610. It is important to be able to access the module during the life of the tire, to see the module or even in order to repair or modify it.

Nowadays, it is preferred, to the extent that the progress achieved permits, to position these modules inside the tire rather than on the outside, where they are exposed to environmental attack such as climatic conditions, incidents on the road or even vandalism.

In order to make it possible to make this means of fastening removable and also for the fastening to be able to take place during after-sales service, certain solutions have been proposed which use repair patches in which a casing bearing the module is removably inserted.

European Patent Publication EP-0 936 089 shows such solutions in which modules comprising both circuits and recharging batteries are inserted into rubber patches comparable to those used for effecting repairs. These devices have a circular housing enabling the module to be put in place, the patches being fixed beneath the crown of the tire by a self-vulcanizing system. Different systems for fastening the module in the housing are presented, such as a module with a locking ring or with a thread for screwing it in.

Although such solutions may be of interest, they nevertheless have numerous drawbacks, because the position of the patch beneath the crown is liable in certain cases to generate magnetic perturbations on the module which are linked to the presence, in particular, of metal plies in the crown. It may therefore be useful to be able to place such a device elsewhere in the tire, for example at the tire bead zone. However, the presence of batteries in the module makes the latter heavier and bulkier, which adversely affects the positioning of the latter in the tire bead zone.

This zone is in fact subjected deformations which risk adversely affecting the high strength of the interface between the patch and the tire. This phenomenon is furthermore accentuated by the large size of the surface of the patch bearing the module, which will produce a large working surface on the tire. It will furthermore be noted that the embodiment shown in the EP document does not make it possible to use a more conventional repair system with a bonding rubber with heat-gluing which improves this strength of the interface.

The subject of the invention is tires and removable fastening devices for electronic monitoring modules which may include batteries, which overcomes all the above disadvantages.

According to the invention, the device for fastening an electronic monitoring module onto a tire comprises a patch of rubber mix, the surface of which is intended to be in contact with the air bears at least one rigid treaded insert intended to cooperate with a screw and a lug borne by a casing bearing the electronic monitoring module.

The invention also relates to a tire thus equipped.

BRIEF DESCRIPTION OF THE DRAWINGS

Other advantages and characteristics of the invention will become apparent on reading description of an exemplary embodiment of a tire according to the invention with reference to the drawings, in which:

FIG. 2 is a section through the fastening device for the module shown in FIG. 1, FIG. 3 is a section through the patch used in the fastening device shown in FIG. 2.

DETAILED DESCRIPTION

Figure 1:
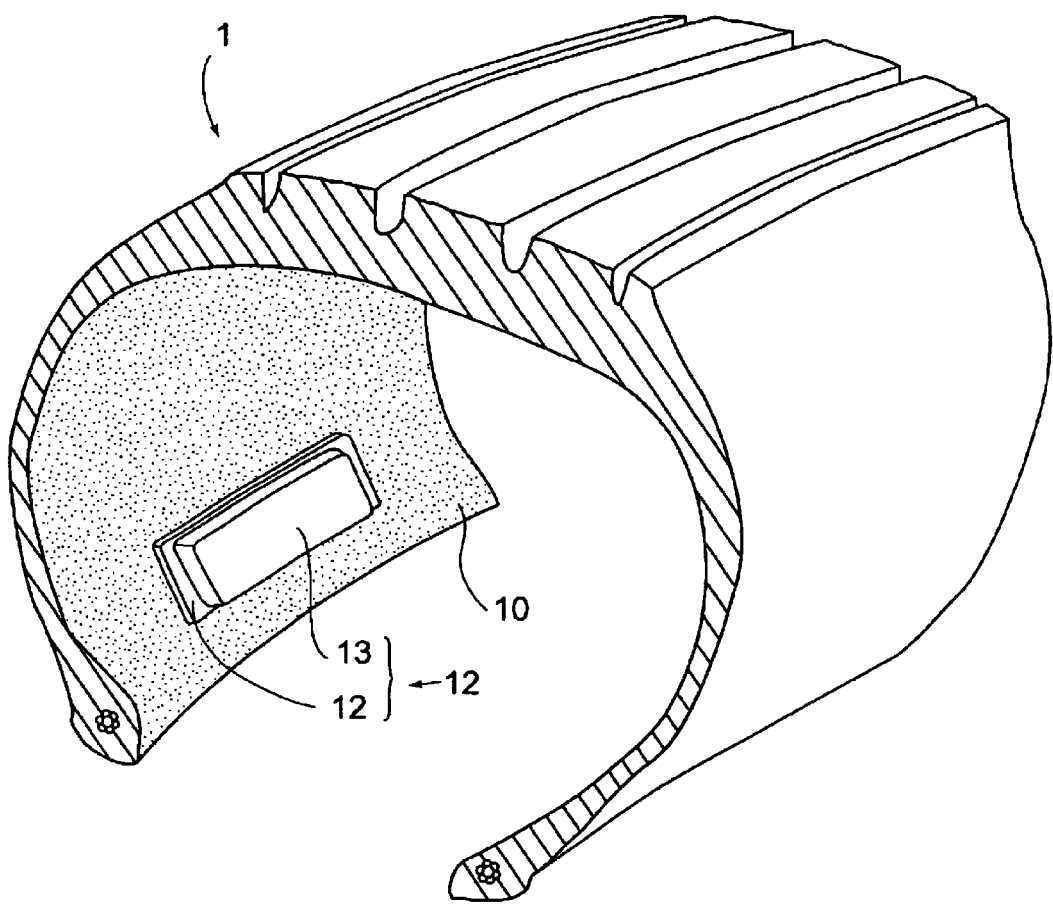
FIG. 1 is a section view of a tire onto which an electronic monitoring module according to the invention is fastened on the inside.

In FIG. 1, the tire 1 carries on its inner liner 10 an electronic monitoring module mounted by a fastening device 11. This fastening device comprises a repair patch 12 fixed to the tire and a casing 13 bearing the electronic module and fastened to the patch 12.

The electronic contents of the casing, which is not the subject of the invention, will not be described here; however, it will be noted that in the example described here it is a module comprising rechargeable batteries, which involves a certain amount of bulk and a certain amount of weight. However, as is stated hereafter, this type of module does not limit the scope of the invention to this sole embodiment.

The fastening device and the manufacturing process therefor will be described in detail below, with reference to FIGS. 2, 3 and 4.

Figure 4:
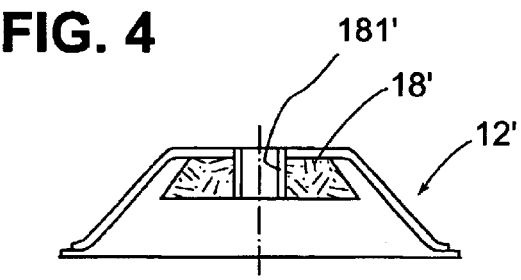
FIG. 4 is a section through the patch shown in FIG. 3 in a variant embodiment.

The same reference characters will be used for identical elements shown in the variant embodiments of the patch of FIGS. 3 and 4.

As shown in FIG. 2, the casing 13 bears two lugs 131 and 132 for fastening to the patch 12 by means of two bolts or screws 14 and 15 for screwing into the patch 12, and washers 16 and 17 cooperating with said screws in order to hold the casing 13 in position relative to the patch 12.

The patch 12 will be described more precisely with reference to FIG. 3. The patch 12 has a lower surface for contact with and bonding to a surface of the tire and an upper surface to be exposed to the air cavity of the tire. The patch 12 has two housings 121 and 122 for receiving inserts 18 and 19 of frustoconical shape which each bear at their respective centre a threaded recess 181 and 191 opening on the upper surface XX and which is intended to cooperate with the screws 14 and 15.

The inserts 18, 19 are positioned in the patch 12 with the respective lesser surfaces 182, 192 upwardly facing. The connection between the patch 12 made of elastomeric mix and the inserts is effected by gluing, but the frustoconical shape of the inserts and the orientation engaging with the patch material makes it possible for the inserts to resist becoming disconnected from the patch under certain stresses.

The contour of the patch follows the frustoconical shape of the inserts 18 and 19, to define two spaced, upwardly facing protuberances shown in FIG. 3, which enables the patch, by means of the specific shape which it adopts, to act with respect to the casing 13 like a shock-mount damping the stresses and deformations to which the tire and hence the patch is subjected. This arrangement makes it possible in particular to position the fastening device 11 in the bead zone of the tire as shown in FIG. 1, but also in any other internal position of the tire.

The outer surface 130 of the patch which will be free once the patch is installed in the tire is covered by a butyl rubber coating in order to maintain its sealing with respect in particular to gases and oxidation. The patch 12 may be made in its entirety of butyl rubber or be formed at the heart of the patch by other elastomeric mixes.

As can clearly be seen in FIG. 3, the surfaces 182, 192 respectively of the bases of lesser diameter of the inserts 18, 19 is not in contact with the air, but in contact with the layer of butyl rubber.

The nature of this insert is selected to have both good adhesion to the rubber and good rigidity, so these inserts may be, for example, made of nylon, bronze or brass. The choice of metal in the case of a metal insert is in fact limited in order not to generate a magnetic field which might interfere with the module.

Provision may be made for the presence in the patch 12 of a reinforcing fabric 20 such as a rayon fabric in order to impart additional rigidity thereto.

In FIG. 3, the patch 12 is in contact with a polyester fabric 21 which will be removed when the patch is used, as for more conventional repair patches, with a bonding rubber for fixing to the tire. Provision may also be made for a self-vulcanizing adhesive for the connection with the tire; however, depending on the position selected for the patch relative to the tire, it may be advantageous to maintain the hot system with the bonding rubber which improves the strength of the patch/tire interface.

The patch can be made by hot molding on the inserts in a mould in the event that a single rubber mix is selected to produce it. It is also possible to produce a stack of products in the cold state in a mould and then to effect curing.

FIG. 4 shows a variant embodiment of the patch 12', which has a single insert 18' bearing the thread 181'. This patch with a single insert may suffice in particular if a module without batteries, and therefore of lesser bulk and lesser weight, is intended. The screw for fastening the casing to the patch may in such a case be directly integral with the casing.

What is claimed is:

1. A device for fastening an electronic monitoring module to a tire, said fastening device comprising a patch formed of a rubber mix and having an upper surface intended to be in contact with air, at least one rigid insert carried on the patch and having a threaded recess for engagement with a screw and a lug borne by a casing bearing the electronic monitoring module, wherein, the insert has a frustoconical shape and is disposed in the patch with the base of lesser diameter at the upper surface.

2. A device according to claim 1, in which an outer shape of the patch follows the frustoconical shape of the insert to define a protrusion.

3. A device according to of claim 1, wherein the insert is made of bronze.

4. A device according to claim 1, in which the insert is made of nylon.

5. A device according to claim 1, in which the insert is made of brass.

6. A device according to claim 1, wherein, the patch has two inserts, the outer form of the patch following the frustoconical shape of the two inserts to define two spaced protrusions, wherein the patch constitutes a shock mount with respect to the casing.

7. A device according to claim 1, further comprising a reinforcing fabric disposed in the patch.

8. A device according to claim 7, in which the reinforcing fabric is formed of rayon.

9. A device according to claim 1, in which the upper surface of the patch is covered with a gas-impermeable coating.

10. A device according to claim 9, in which the gas-impermeable coating is formed by a butyl rubber.

11. A device for fastening an electronic monitoring module to a tire, comprising:
   a casing for containing electronic monitoring components having lugs extending laterally therefrom;
   a patch of rubber mix having an upper surface for contact with air and a lower surface for bonding to a tire surface;
   two rigid inserts carried by the patch and each having a threaded recess opening on the upper surface; and,
   a threaded fastener for insertion through the lug on the casing and engageable with the at least one threaded recess to secure the casing to the patch.

12. A device according to claim 11, wherein the patch is shaped with two upwardly extending, spaced protuberances, each protuberance carrying one insert.

13. A device according to claim 12, in which the upper surface of the patch is covered with a gas-impermeable coating.

14. A device according to claim 13, in which the gas-impermeable coating is formed by a butyl rubber.

15. A device according to claim 11, in which the inserts have a frustoconical shape and are disposed in the patch with the base of smaller diameter upwardly facing.

16. A device according to claim 11, wherein the inserts are made of bronze.

17. A device according to claim 11, wherein the inserts are made of nylon.

18. A device according to claim 11, wherein the inserts are made of brass.

19. A device according to claim 11, further comprising a reinforcing fabric disposed in the patch.

20. A device according to claim 19, wherein the reinforcing fabric is formed of rayon.

* * * * *